United States Patent
Bäse et al.

(10) Patent No.: US 8,116,373 B2
(45) Date of Patent: Feb. 14, 2012

(54) CONTEXT-SENSITIVE ENCODING AND DECODING OF A VIDEO DATA STREAM

(75) Inventors: Gero Bäse, München (DE); Klaus Illgner-Fehns, München (DE); Robert Kutka, Geltendorf (DE); Jürgen Pandel, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 1052 days.

(21) Appl. No.: 10/503,613

(22) PCT Filed: Feb. 4, 2003

(86) PCT No.: PCT/DE03/00306
§ 371 (c)(1), (2), (4) Date: Aug. 5, 2004

(87) PCT Pub. No.: WO03/067895
PCT Pub. Date: Aug. 14, 2003

(65) Prior Publication Data
US 2005/0089234 A1  Apr. 28, 2005

(30) Foreign Application Priority Data
Feb. 5, 2002 (DE) .................................. 102 04 617

(51) Int. Cl.
*H04N 7/12* (2006.01)
(52) U.S. Cl. ................... 375/240.02; 382/239; 382/238; 382/244
(58) Field of Classification Search ............. 375/240.01, 375/240.2; 382/239
See application file for complete search history.

(56) References Cited

U.S. PATENT DOCUMENTS

| 5,381,145 A | | 1/1995 | Allen et al. |
| 5,471,206 A | | 11/1995 | Allen et al. |
| 5,471,207 A | * | 11/1995 | Zandi et al. .................... 341/107 |
| 5,550,589 A | * | 8/1996 | Shiojiri et al. ............. 348/386.1 |
| 5,583,500 A | | 12/1996 | Allen et al. |
| 5,680,129 A | * | 10/1997 | Weinberger et al. ............ 341/65 |
| 5,717,394 A | | 2/1998 | Schwartz et al. |
| 5,751,356 A | * | 5/1998 | Suzuki ..................... 375/240.01 |
| 5,764,374 A | | 6/1998 | Seroussi et al. |
| 5,818,877 A | * | 10/1998 | Tsai et al. ..................... 375/241 |
| 5,903,676 A | * | 5/1999 | Wu et al. ....................... 382/244 |
| 6,157,674 A | * | 12/2000 | Oda et al. ...................... 375/240 |

FOREIGN PATENT DOCUMENTS

| DE | 446072 A1 | 6/1995 |
| EP | 1037468 | 9/2000 |

OTHER PUBLICATIONS

Patent Abstract of Japan, Publication No. 2000115781, Apr. 21, 2000.
Patent Abstract of Japan, Publication No. 2001136524, May 18, 2001.
Weinberger et al., "LOCO-I: A Low Complexity, Context-Based, Lossless Image Compression Algorithm", Mar. 3, 2003, pp. 140-149.

* cited by examiner

*Primary Examiner* — Jay Au Patel
*Assistant Examiner* — Jessica Prince
(74) *Attorney, Agent, or Firm* — King & Spalding L.L.P.

(57) ABSTRACT

Disclosed are methods and devices for compressing and decompressing video data streams, according to which the statistical relationship between image symbols and the context assigned thereto is used for compression. Particularly disclosed is a context-sensitive encoding unit in which the image symbols filed in an image storage are assigned to different encoding branches via a context switch, where they are encoded and compressed by a Golomb encoder and a run length encoder.

23 Claims, 3 Drawing Sheets

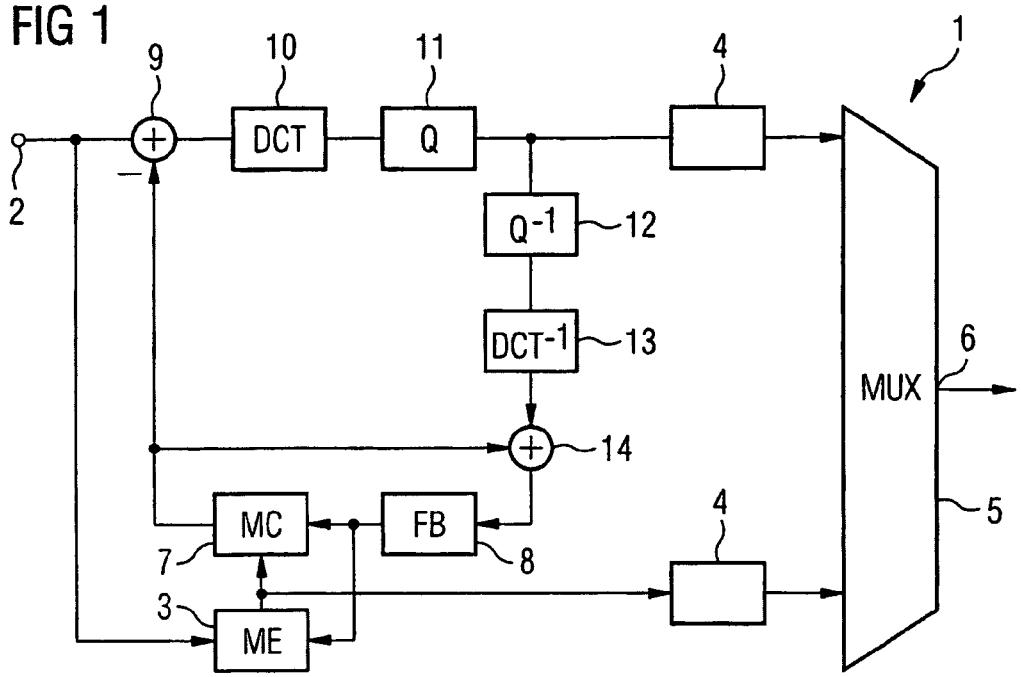

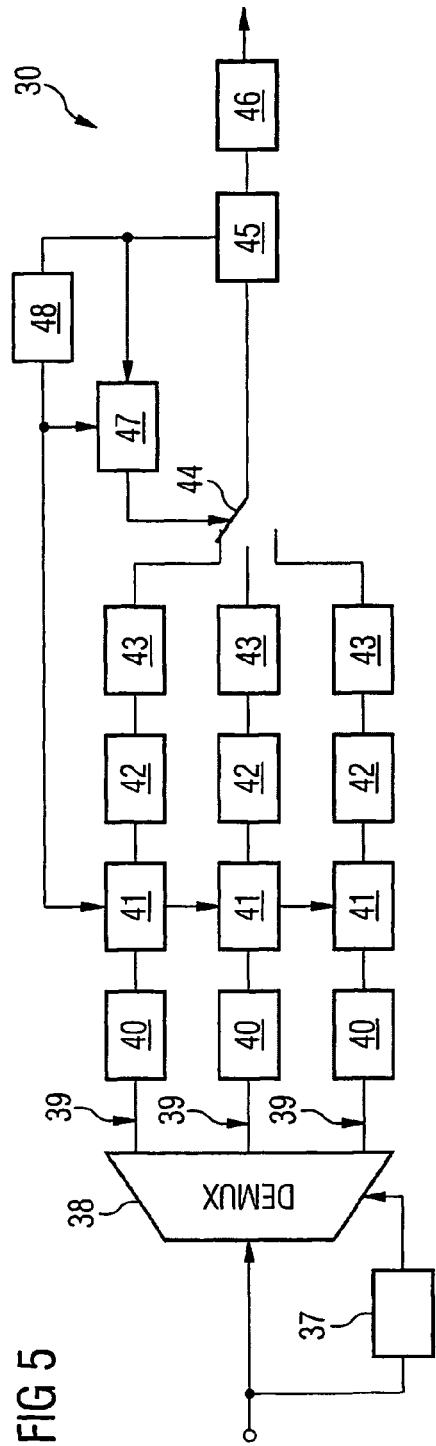
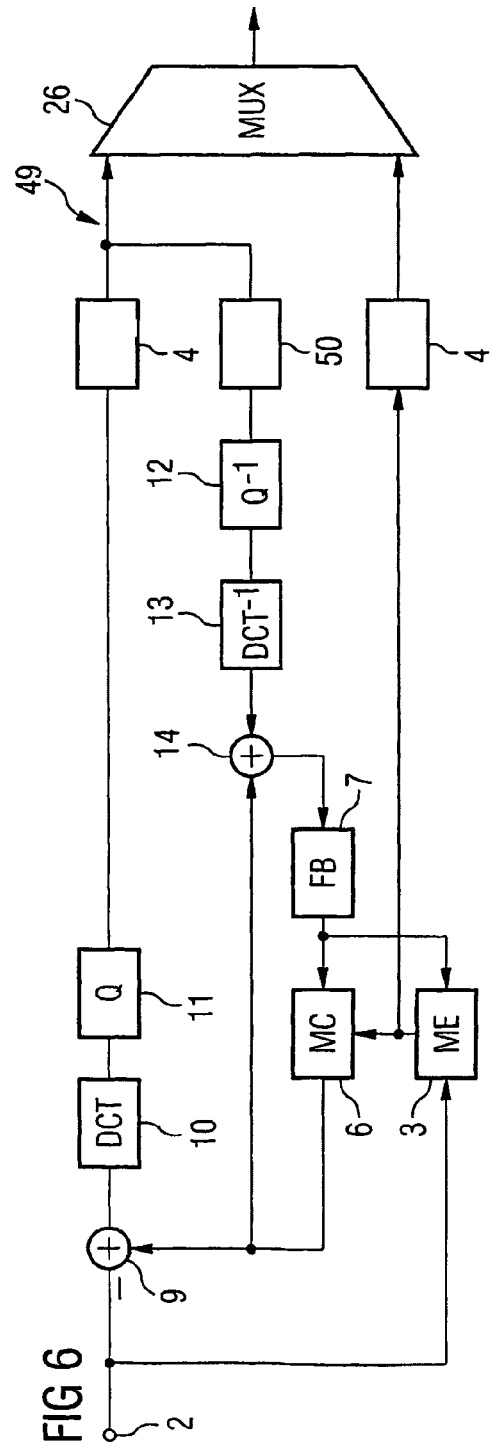
FIG 5
FIG 6

CONTEXT-SENSITIVE ENCODING AND DECODING OF A VIDEO DATA STREAM

CROSS REFERENCE TO RELATED APPLICATIONS

This application is based on and hereby claims priority to PCT Application No. PCT/DE03/00306 filed on Feb. 4, 2003 and German Application No. 102 04 617.4 filed on Feb. 5, 2002, the contents of which are hereby incorporated by reference.

BACKGROUND OF THE INVENTION

The invention relates to method for compression and decompression of a video data stream. The invention further relates to devices for executing the method.

Compression methods of this type are especially necessary for transporting video data over packet-oriented data networks since the bandwidth of packet-oriented data networks is tightly restricted. Standardized methods such as for example MPEG-1, MPEG-2 and H.26× have thus been developed with which video data can be compressed. The standardized methods operate with motion-compensating hybrid encoding, a combination of lossless redundancy reduction and lossy irrelevance reduction.

The greatest contribution to compression is made by what is known as motion-compensating prediction. Motion-compensating prediction uses the similarity of consecutive images by predicting the current image to be encoded from images already transmitted. Since mostly only parts of consecutive images move, an encoder breaks down the current image to be encoded into rectangular macro blocks which are mostly 8×8 or 16×16 pixels in size. For each of these macro blocks the encoder searches for matching macro blocks from the images already transmitted and calculates how they have shifted in relation to the macro blocks of the current image to be encoded. The shifts in the macro blocks are described by motion vectors which are encoded by the encoder on the basis of code tables.

Since the current image to be encoded cannot be constructed in every case by the shifts in macro blocks of images already transmitted, for example when new objects come into the image, the prediction error must also be transmitted from the encoder to the decoder. This prediction error is the result of the difference between the actual current image to be encoded and the prediction image constructed from shifts in macro blocks from previous images.

Since the prediction errors of adjacent pixels correlate in areas that cannot be predicted or cannot be well predicted, a transformation of the prediction errors is undertaken for further redundancy reduction. Depending on the compression method, various transformation methods are employed here. Typical normal methods are Discrete Wavelet Transformation (DWT) or Discrete Cosine Transformation (DCT). Discrete Cosine Transformation transforms each macro block from 8×8 pixels into a matrix of 8×8 spectral coefficients. In this case the first coefficient represents the average brightness of the block, this also being referred to as the direct component or "DC coefficient". The remaining coefficients reflect with increasing index number the higher frequency component of the brightness distribution and are thus referred to as "alternating components" or "AC coefficients".

To reduce the required data rate further, the spectral coefficients are quantized before further encoding. When the prediction error signal changes only slowly from pixel to pixel, most of the high-frequency coefficients are equal to zero after quantizing and thus do not have to be transmitted.

Since after transformation most spectral coefficients are zero, the spectral coefficients are grouped together during subsequent execution of the method by run length encoding and subsequently encoded with the aid of a code table with variable-length code words.

SUMMARY OF THE INVENTION

Starting from this related art, one possible object of the invention is to specify methods for compression and decompression of video data which, by comparison with known methods, feature a higher level of compression.

The inventors propose a method for compression of video data, in which the video data of an image is represented by image symbols, with the following steps:
  Reading image symbols out of an image memory;
  Sorting the image symbols with the aid of a context switch onto various encoding branches into image group symbols, which are assigned to different contexts in each case, where the context switch is moved into a prespecified position at a prespecified time and is then activated depending on the relevant context of the image symbol to be transmitted;
  Entropy encoding of the image symbol groups and merging of the data output in the encoding branches into a compressed video data stream.

The inventors also propose a method for decompression of a compressed video data stream, in which video data of image symbols representing an image is extracted from the video data stream, by the following steps:
  Dividing up the video data stream into bit stream segments which are each assigned to a context;
  Entropy decoding of the bit stream segments into image symbol groups; and
  Transmission of the image symbols in the image symbol groups distributed over various decoding branches via a context switch into an image memory, where the context switch is in a prespecified position at a prespecified time and is then activated in accordance with the context of the image symbols.

The method for compression and decompression is based on the knowledge that the probability of an image symbol occurring can be strongly dependent on the relevant context. The method exploits this situation by having the image symbols sorted depending on the relevant context into the encoding branches. The image symbols distributed on the coding branches can then be effectively encoded with a code adapted to the frequency distribution of the image symbols in the relevant context with a variable word length. Such a code is also referred to below as an entropy code. It is especially advantageous that a code matched to the actual frequency distribution of the image symbols in the relevant context can be used.

In a preferred embodiment binary symbols are distributed on the encoding branches and subsequently subjected to run length encoding, in which the number of consecutive identical symbols is counted and encoded by a number assigned to the symbol.

This embodiment of the method exploits the situation whereby in a specific context a large number of identical symbols occur which can be effectively encoded by run length encoding. The fact that the image symbols are sorted into the encoding branches depending on the relevant context, so that groups of image symbols are present in the encoding branches, each of which features a large number of identical image symbols creates the condition for effective run length encoding.

With a further preferred embodiment an analytically calculable entropy code is used in the relevant encoding branch or decoding branch for the code with variable word length which is adapted during the compression or decompression process to the frequency distribution of the image symbols in the relevant context.

Use of an analytically generatable code enables permanently stored code tables containing a code adapted to any possible context to be dispensed with. Instead the entropy codes used can easily be adapted to the actual frequency distributions which occur. Precise adaptation to the frequency distributions actually occurring allows efficient encoding of the image symbols which further reduces the bandwidth necessary for transmission.

In a further preferred embodiment the analytically calculable Golumb code is used for encoding the image symbols.

The Golumb code is especially suited for ongoing adaptation to the relevant frequency distribution of the image symbols, since this code in is able to be continuously calculated depending on a single parameter and is therefore easy to parameterize. This code also offers the advantage, by contrast with arithmetic encoding, of being error-tolerant.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a block diagram which shows the structure of an encoder and the execution sequence of the method used for compression;

FIG. 2 is a diagram which shows the image symbols of a macro block of a video image in which the image symbols to be transmitted and the associated context are entered;

FIG. 5 is a block diagram of a context-sensitive decoder unit in which the execution sequence of the context-sensitive decoder method is also shown; and FIG. 6 is a block diagram of a modified encoder.

DETAILED DESCRIPTION OF THE PREFERRED EMBODIMENT

Figure 3:
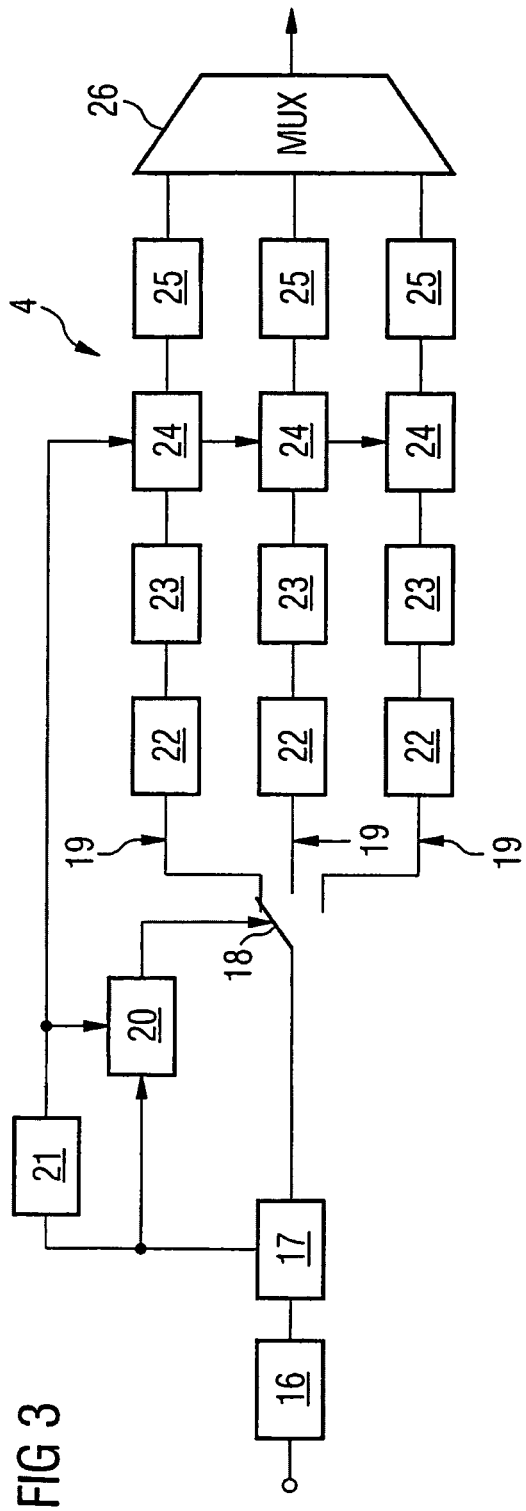
FIG. 3 is a block diagram of a context-sensitive encoding unit which at the same time illustrates the execution of context-sensitive encoding.

Reference will now be made in detail to the preferred embodiments of the present invention, examples of which are illustrated in the accompanying drawings, wherein like reference numerals refer to like elements throughout.

FIG. 1 shows an encoder 1 which operates in accordance with the principle of the motion-compensating hybrid encoding. The encoder 1 has an input 2 via which the video data stream is fed to the encoder 1. In particular video data of a sequence of images is fed via the input 2 to the encoder. A motion estimation unit 3 segments the current image to be encoded of the video data stream into rectangular macro blocks which are mostly 8×8 or 16×16 pixels in size. For each of these macro blocks the motion estimation unit 3 looks for matching macro blocks from the images already transmitted and calculates their motion vectors. The motion vectors can then be encoded with the aid of known code tables but also with the aid of a context-sensitive encoding unit 4 described in greater detail below and embedded via a multiplexer 5 into a bit stream output at an output 6. The motion vectors of the macro blocks calculated by the motion estimation unit 3 are also notified to a motion compensator 7 which, starting from the images already transmitted stored in an image memory 8, calculates the prediction image produced by the shifts of the macro blocks of the images already transmitted. This prediction image is subtracted in a subtractor 9 from the original image in order to create a prediction error which is fed to a discrete cosine transformer 10 with downstream quantizer 11. The error is also referred to as the prediction error or texture. The transformed and quantized prediction error is forwarded to a further context-sensitive encoding unit 4 which converts the transformed and quantized prediction error data into bit stream segments which are read out by the multiplexer 5 and embedded into the bit stream output at the output 6.

Processing in the discrete cosine transformer 10 represents the macro blocks with for example 8×8 pixels as a matrix of 64 spectral coefficients. In this case the first coefficient contains the average brightness and is therefore also known as the direct component or DC coefficient. The remaining spectral coefficients reflect higher frequency components of the brightness distribution with increasing index number, which is why they are referred to as alternating components or AC coefficients. The data rate is further reduced by the subsequent quantizer 11. With planar image elements the prediction error only changes slowly from pixel to pixel, so that after processing in quantizer 11 most of the high-frequency spectral coefficients are equal to zero and thus do not even have to be transmitted.

The quantizer 11 additionally takes account of psychovisual effects. Since the human brain perceives low-frequency image components, namely flat extended areas of image components, far more clearly than high-frequency image components, namely details. Thus the high-frequency spectral coefficients will be quantized more roughly than the low-frequency spectral coefficients.

To adjust the images already transferred stored in the image memory 8, the spectral coefficients are fed to an inverse quantizer 12 and an inverse discrete cosine transformer 13 and the data reconstructed from the prediction error in this way added in an adder 14 to the prediction image created by the motion compensator 7. The image thus created corresponds to the image produced on decoding. This image is stored in the image memory 8 and is used by the motion estimation unit 3 as a basis for calculating the motion vectors of the following images.

The layout and the function of the context-sensitive encoding unit 4 will be explained below with reference to FIGS. 2 and 3.

In FIG. 2 variables $x_1$ to $x_{64}$ are used to represent the spectral coefficients output by quantizer 11. Spectral coefficient $x_1$ represents the DC component or DC coefficient. The spectral coefficients $x_8$ and $X_{57}$ are the spectral coefficients assigned in each case to the highest image frequencies in the x and y direction. Spectral coefficient $x_{64}$ corresponds to the highest image frequency along the image diagonals. If the coding unit 4 is used for encoding the motion vectors the variables $x_1$ to $x_{64}$ can also represent different shift vectors.

The spectral coefficients generated by the discrete cosine transformer are ideally fully decorrelated, i.e. adjacent spectral coefficients are statistically independent of one another. Even with an ideal decorrelation of the spectral coefficients this does not necessarily apply to the individual bits in the bit levels of the spectral coefficients. Instead a high degree of statistical dependencies exist here. This is based on the fact that the spectral coefficients generally feature small values, so in the area of the lower less significant bit levels logical 1 is frequently present.

In FIG. 2 for example the spectral coefficient $x_{19}$ is highlighted for which the binary value at a specific bit level statistically depends on the binary values of the spectral coefficients of a context group 15 at the relevant bit level. In FIG. 2 the context group 15 is formed from the binary values of the spectral coefficients $x_1$ to $X_3$, $x_9$ to $x_{11}$, as well as $X_{17}$ and $x_{18}$ at a specific bit level. The frequency distribution of the binary values for the spectral coefficient $x_{19}$ at the relevant bit level statistically depends on the binary values of the adjacent spectral coefficients at this bit level.

The values of the variables $x_i$ are referred to as image symbols below. The totality of the image symbols forms an alphabet. A specific combination of values of the variables in a context group C is referred to for short as a context below.

The context-sensitive encoder unit 4 shown in detail below in FIG. 3 exploits the statistical dependencies between the image symbols and the relevant assigned context for effective encoding.

In the context-sensitive encoder unit 4 the variables $x_i$ are broken down by a bit level scanner 16 into bit levels. The bit levels are transferred consecutively, starting with the highest-order bit level, into a buffer memory 17. In this case this means that there are only two different image symbols, namely logical 0 and logical 1.

The image symbols are read out serially in a prespecified sequence from the buffer memory 17. The image symbols read out from the buffer memory 17 are sorted with the aid of a context-sensitive switch 18 onto encoding branches 19. The context-sensitive switch 18 is controlled in this case by a context discriminator 20 which determines for each image symbol the associated context and ensures that the image symbols are assigned to the encoding branches 19 accordingly. In addition to the context discriminator 20 there is also a cluster unit 21 present which evaluates the frequency distribution of the image symbols in the relevant contexts and, if the frequency distribution of the image symbols in different contexts matches, causes the context discriminator 20 to locally group the matching contexts as regards the frequency distribution of the image symbols and assign then to a common encoding branch 19.

The image symbols assigned to one of the encoding branches 19 are initially stored in an image symbol buffer 22. Subsequently the image symbols are converted into run length encoding symbols with the aid of run length encoding 23 which converts the image symbols into run length encoding symbols. If the frequency distribution of the image symbols deviates from equal distribution in accordance with the relevant context, a few image symbols will occur especially frequently in the encoding branches 19. The same image symbols can however be grouped together effectively with the aid of run length encoding 23 into run length symbols. With run length encoding consecutive equivalent image symbols are counted and encoded by the occurrence number. The binary sequence "000100" is encoded to "302" for example, where the "0" stands for the binary "1".

In further execution the run length symbols are converted by a Golumb encoder 24 into code symbols with different codeword lengths. The Golumb code as such is known to the expert and not discussed in this application.

Golumb encoding is especially suitable for encoding run length symbols since run length encoding of the binary image symbols produces an practically geometrical distribution of the run length symbols. Golumb encoding is particularly suitable for this type of distribution.

Since the frequency distribution of the image symbols is continuously determined by the cluster unit 21, the cluster unit 21 can control the Golumb encoder 24 in such as way that the Golumb code used by the Golumb encoders 24 for encoding the run length symbols is matched to the frequency distribution of the image symbols occurring a specific context.

In this context to the Golumb code is of particular advantage. This is because the Golumb code is especially suited for an adjustment to the changing frequency distribution of the image symbols in a specific context since parameters can be set for the Golumb code and with the aid of an individual parameter it can be adapted to the changing frequency distribution of symbols in an alphabet.

The code symbols generated by the Golumb encoder 24 are stored as bit stream segments in a bit stream buffer 25. A multiplexer 26 merges the bit stream segments of the individual encoding branches 19 into a single bit stream segment, where the individual bit stream segments of the encoding branches 19 are each provided with a "header" into which the length of the relevant bit stream segment is entered.

The function of the multiplexer 26 can also be taken over by multiplexer 5 which provides a compressed video data stream at output 6 in which the information about the shift vectors and the prediction error data is embedded.

In summary this enables the following procedural steps listed in the context-sensitive encoding unit 4 to be adhered to:

Serial reading out of the image symbols from an image memory 15;

Sorting the image symbols with the aid of a context switch on various encoding branches into image group symbols which are assigned to different contexts in each case, where the context switch is moved into a prespecified position at a prespecified time and is then activated depending on the relevant context of the image symbol to be transmitted;

Run length encoding of the image symbols distributed on encoding branches 19 into run length symbols;

Conversion of the run length symbols with the aid of an entropy code adapted to the entropy of the relevant context into code symbols which are merged into a bit stream segment;

Combination of the bit stream segments by multiplexer 26 into a compressed video data stream.

In a further exemplary embodiment not shown the context is not selected at bit level but using the full spectral coefficients. Selecting a context at full spectral coefficient level makes sense if, as a result of the image statistics, processing by the discrete cosine transformer 10 does not represent the ideal decorrelating transformation so that the spectral coefficients are not completely decorrelated.

In practice discrete cosine transformation is not the ideal decorrelating transformation, so that statistical dependencies exist between the spectral coefficients which can be exploited by sorting according to contexts and subsequent Golumb encoding. In this case however the run length encoding mentioned is not effective since the full spectral coefficients can assume a large number of values, so that an extremely extensive alphabet is produced. Since in this case the occurrence frequencies of the image symbols observed in accordance with the relevant contexts follow almost geometrical distributions, sorting in accordance with contexts and Golumb encoding adapted to the relevant context is entirely sensible.

In addition it is also possible for decorrelated spectral coefficients of a macro block to sort the spectral coefficients so that for selection of the context group only the spectral coefficients of the same frequency, for example all spectral coefficients $x_1$, from the adjacent macro blocks are considered. This allows statistical dependencies between the spectral coefficients to be established.

The associated decoding method is considered below. It is taken as read that a decoding method must feature the corresponding steps. Such a decoding method will now be explained with reference to FIGS. 4 and 5.

Figure 4:
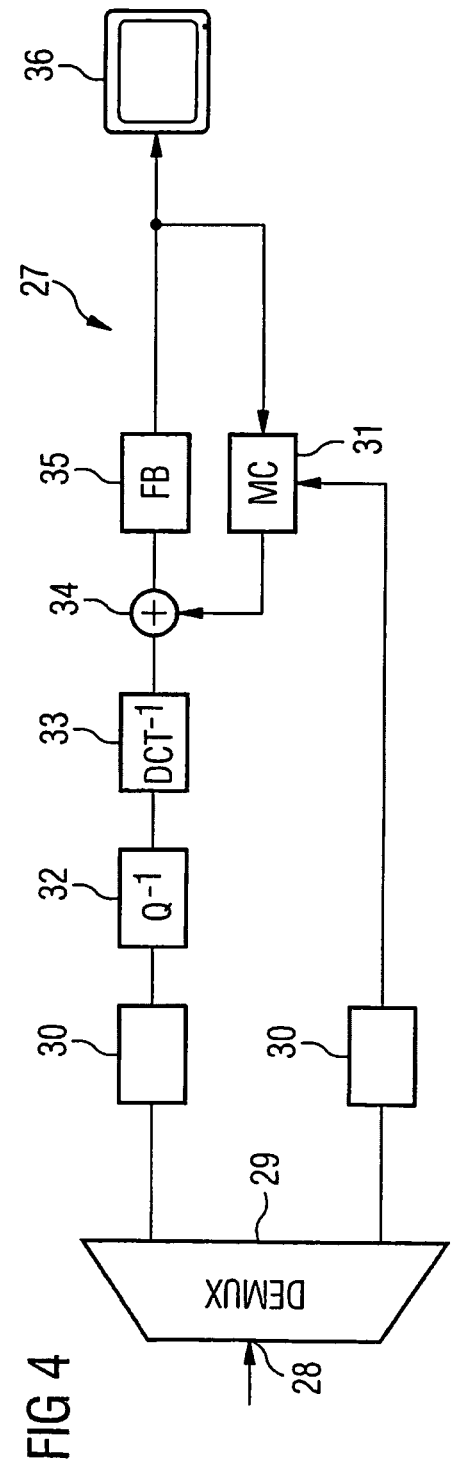
FIG. 4 is a block diagram with the layout of a decoder, which at the same time illustrates the execution sequence of the decoding method.

FIG. 4 shows a decoder 27 for the video data stream generated by encoder 1. The decoder 27 receives the video data stream at an input 28 to which demultiplexer 29 is connected downstream. The demultiplexer 29 feeds the information relating to the shift vectors via a context-sensitive decoder 30 described in greater detail below to a motion compensator 31. Those parts of the video data stream containing information about the prediction errors are fed to a further context-sensitive decoder unit 30 which reconstructs the prediction error data from the incoming bit stream. The prediction error data is fed to an inverse quantizer 32 and an inverse discrete cosine transformer 33 and added in an adder 34 to the data delivered by the motion compensator 31 and stored in an image memory 35. The image memory 35 is finally connected to a display unit 36 in which the video images are displayed.

FIG. 5 shows the context-sensitive decoder unit 30 in detail. The context-sensitive decoder unit 30 features a header parser 37 which reads out the header information containing the bit stream and controls a demultiplexer 38 so that the bit stream segments assigned to the individual contexts are distributed on the decoding branches 39. The bit stream segments are in this case first written into the bit stream buffer 40 and subsequently converted by a Golumb decoder 41 into a sequence of run length symbols which are transformed by a run length decoder 42 into the assigned image symbols and written into the image symbol buffer 43. From the image symbol buffer 43 the image symbols are read out via a context switch 44 into a buffer 45 to which an image composer 46 is connected downstream, in which the bit levels are reconstructed.

At the beginning of the transmission from the image symbol buffer 43 into the buffer 45 the context switch 44 is in a preset position. As the readout process proceeds the context switch 44 is controlled by a context discriminator 47. The context discriminator 47 determines from the image symbols read out the context of the image symbol to be read out and switches the context switch 44 to the relevant decoding branch 39. As with the context-sensitive encoding unit 4, a cluster unit 48 is also present in the context-sensitive decoding unit 30 which evaluates the frequency distribution of the image symbols and by controlling the context discriminator 47 determines the assignment of the contexts to the decoding branches 39. In addition the cluster unit 48 controls the Golumb decoder 41 in that the cluster unit 48 selects a Golumb code adapted to the frequency distribution of the image symbols. The rules under which the cluster unit 48 operates must be the same as the rules under which the cluster unit 21 of the context-sensitive encoding unit 4 operates so that the context switch 44 can operate the context-sensitive decoder unit 30 in precisely the same way as context switch 18 operates the context-sensitive encoder unit 4.

Thus the context-sensitive decoder unit 30 executes the following steps:

Distribution of bit stream segments of the video data stream by the demultiplexer 38 on decoding branches 39 which are each assigned to an image symbol context;

Entropy decoding of the bit stream segments into run length symbols;

Run length decoding of the run length symbols into video data of image symbols representing an image;

Transmission of the image symbols on the decoding branches 39 via the context switch 44 into an image memory 45, in which case the context switch 44 is in a prespecified position at a prespecified time and is subsequently operated in accordance with the context of the image symbols.

Finally, FIG. 6 shows a modified encoder 49 in which the transformed prediction error data is not tapped off immediately after the quantizer 11 but after the context-sensitive decoder unit 4 and is transformed back by an inverse context-sensitive decoder unit 50, the inverse quantizer 12 and the inverse discrete cosine transformer 13.

In conclusion it should be pointed out that the method described here can be used whenever a statistical relationship exists between image symbols and a context. The image symbols can in this case be individual bits or also groups of bits in a bit level or extending over a plurality of bit levels. This means that clustering of image symbols is also possible.

Finally it should be pointed out that the devices and methods described here for compression and decompression of video data streams can be realized both in hardware and in software. A mixed implementation is also conceivable.

The method described here is in principle independent of the specific data source and can thus be used to extend beyond the encoding of a texture to be used for encoding of administrative information.

The invention has been described in detail with particular reference to preferred embodiments thereof and examples, but it will be understood that variations and modifications can be effected within the spirit and scope of the invention.

The invention claimed is:

1. A computer-implemented method for compression of a video data stream, in which video data of an image is represented by image symbols, the method performed by logic instructions embodied in computer hardware and comprising the steps of:

reading image symbols out of an image memory;

sorting the image symbols with the aid of a context switch on various encoding branches into image symbol groups which are each assigned to different contexts, wherein the image symbols are sorted by:

setting the context switch to a prespecified position at a prespecified time; and activating the context, switch after the pre-specified time, in accordance with the context of the image symbol to be sorted;

adaptively assigning particular contexts to particular encoding branches by:

evaluating the frequency distribution of image symbols sorted to different contexts;

identifying two or more contexts having a matching frequency distribution of image symbols; and grouping the two or more identified contexts together, by assigning the two or more identified contexts together to a common encoding branch, such that sorting determinations for image symbols subsequently received at the context switch are influenced by frequency distributions of previously sorted image symbols; and performing entropy encoding of the image symbol groups and merging a data output by the respective encoding branches into a compressed video data stream.

2. A method according to claim 1, wherein the image symbols existing in the individual encoding branches are converted by a working length encoder assigned to the relevant encoding branch into working length symbols.

3. A method according to claim 2, wherein
the working length symbols are converted into code symbols of the entropy code with the aid of an entropy code adjusted to the frequency distribution of the image symbols in the relevant context.

4. A method in accordance with claim 3, wherein
the bit stream segments generated by entropy encoding are merged by a multiplexer to form a compressed video data stream.

5. A method in accordance with claim 1, wherein
the entropy code used for converting the image symbols into code symbols is calculated analytically, and
the entropy code is adapted to the frequency distribution of the image symbols in the relevant context.

6. A method in accordance with claim 1, wherein a Golumb code is used for the entropy code.

7. A method in accordance with claim 1, wherein texture data is used for the video data to be compressed.

8. A method in accordance with claim 1, wherein
information elements relating to the length of the bit stream segments is added into the compressed video data stream by the multiplexer.

9. A method in accordance with claim 8, wherein
the entropy code used for converting the image symbols into code symbols is calculated analytically, and
the entropy code is adapted to the frequency distribution of the image symbols in the relevant context.

10. A method in accordance with claim 9, wherein a Golumb code is used for the entropy code.

11. A method in accordance with claim 10, wherein texture data is used for the video data to be compressed.

12. A method according to claim 1, wherein the frequency distribution of the image symbols relates to a frequency at which the image symbols change in a predefined portion of a video image.

13. A device to compress a video data stream in which video data of an image is represented by image symbols, comprising:
a context switch controlled by a context logic, the context switch being connected downstream of an image memory and being operable to read out image symbols from the image memory and further operable to sort the image symbols based on context into image symbol groups on various encoding branches, wherein the context switch is further operable to be set to a prespecified position at a prespecified time, and operable to be activated after the prespecified time, in accordance with the context of the image symbol to be sorted;
a cluster unit operable to evaluate the frequency distribution of image symbols sorted to different contexts, identify two or more contexts having a matching frequency distribution of sorted image symbols, and group the two or more identified contexts together by assigning the two or more identified contexts together to a common encoding branch, such that sorting determinations for image symbols subsequently received at the context switch are influenced by frequency distributions of previously sorted image symbols;
an entropy encoder to convert the image symbols of the image symbol groups; and
a multiplexer to merge a code output of the entropy encoder to a compressed video data stream.

14. A computer-implemented method for decompressing a compressed video data stream, in which the image symbols are extracted from the video data stream, the method performed by logic instructions embodied in computer hardware and comprising the steps of:
dividing the video data stream into bit stream segments which are each assigned to a context;
entropy decoding the bit stream segments into image symbol groups; and
transmitting the image symbols in the image symbol groups distributed over various decoding branches via a context switch into an image memory, wherein the context switch is in a prespecified position at a prespecified time, and the context switch is activated after the prespecified time, in accordance with the context of the image symbols, wherein the decoding branches are adaptively assigned to the contexts of the image symbols during the decompression with the aid of a context logic which adaptively assigning particular contexts to particular encoding branches by evaluating frequency distribution of the image symbols in relevant contexts, identifying two or more contexts having a matching frequency distribution of image symbols, and grouping the two or more identified contexts together by assigning the two or more identified contexts together to a common encoding branch, such that sorting determinations for image symbols subsequently received at the context switch are influenced by frequency distributions of previously sorted image symbols.

15. A method in accordance with claim 14, wherein the entropy decoder uses an analytically calculatable entropy code.

16. A method according to claim 15, wherein the run length symbols are encoded in Golumb code.

17. A method in accordance with claim 14, wherein code symbols contained in the bit stream segments are converted into working length symbols by an entropy decoder, said working length symbols then being decoded by a working length decoder into image symbols representing video data of an image.

18. A method in accordance with claim 14, wherein the bit stream segments of the video data stream are distributed by a demultiplexer to respective decoding branches which are each assigned to a context.

19. A method in accordance with claim 14, wherein the demultiplexer is controlled by information elements inserted into the data stream and relating to a length of the bit stream segments.

20. A method in accordance with claim 14, wherein texture data is used for the video data.

21. A device to decompress a video data stream, comprising:
a demultiplexer operable to sort the video data stream into bit stream segments onto various decoding branches assigned to different contexts of the image symbols;
each decoding branch comprising an entropy decoder operable to decode the bit stream segments into image symbol groups, and
a context switch arranged downstream of said entropy decoders operable to transmit the image symbols in the image symbol groups distributed over the various decoding branches into an image memory; and
a context logic controlling said context switch and being operable to evaluate the frequency distribution of the image symbols in respective contexts, and further operable to adaptively assign the decoding branches to the contexts of the image symbols during decompression based on the evaluated frequency distribution of the image symbols in the respective contexts, including:

evaluating the frequency distribution of image symbols, sorted to different contexts;

identifying two or more contexts having a matching frequency distribution of sorted image symbols; and grouping the two or more identified contexts together by assigning the two or more identified contexts together to a common encoding branch;

such that sorting determinations for image symbols subsequently received at the context switch are influenced by frequency distributions of previously sorted image symbols.

22. A device in accordance with claim 21, wherein the decoding branches each have a working length decoder.

23. A device in accordance with claim 13, wherein the context switch is operable to distribute the image symbols as a function of the context to different code branches, wherein each code branch has an entropy encoder for an entropy code adjusted to the frequency distribution of the image symbols in relevant context and a working length encoder and wherein each code branch is connected on an output side to a multiplexer.

* * * * *